United States Patent [19]

Heegard

[11] Patent Number: 5,745,522
[45] Date of Patent: Apr. 28, 1998

[54] RANDOMIZER FOR BYTE-WISE SCRAMBLING OF DATA

[75] Inventor: Chris Heegard, Ithaca, N.Y.

[73] Assignee: General Instrument Corporation of Delaware, Chicago, Ill.

[21] Appl. No.: 556,415

[22] Filed: Nov. 9, 1995

[51] Int. Cl.[6] .............................. H04B 15/00; H04K 1/00; H04L 27/30

[52] U.S. Cl. ............................. 375/208; 380/9; 380/46; 364/717.03

[58] Field of Search .............................. 331/78; 375/200, 375/208; 364/717.03, 746.1; 380/9, 47, 46; 370/515

[56] References Cited

U.S. PATENT DOCUMENTS

| | | | |
|---|---|---|---|
| 3,911,330 | 10/1975 | Fletcher et al. | 380/46 |
| 4,587,627 | 5/1986 | Omura et al. | 364/754 |
| 4,755,987 | 7/1988 | Lee et al. | 380/9 |
| 4,903,266 | 2/1990 | Hack | 371/21.2 |
| 5,206,824 | 4/1993 | Arazi | 364/746.1 |
| 5,243,650 | 9/1993 | Roth et al. | 380/19 |
| 5,365,585 | 11/1994 | Puhl et al. | 380/9 |
| 5,394,405 | 2/1995 | Savir | 371/27 |
| 5,412,665 | 5/1995 | Groudis et al. | 371/27 |
| 5,438,622 | 8/1995 | Normile et al. | 380/46 |
| 5,446,683 | 8/1995 | Mullen et al. | 364/717 |

*Primary Examiner*—Stephen Chin
*Assistant Examiner*—Bryan Webster
*Attorney, Agent, or Firm*—Barry R. Lipsitz; Ralph F. Hoppin

[57] ABSTRACT

An N-bit, byte-wise data randomizer uses a linear feedback shift register arrangement where each register stage stores N-bits. In this manner, a pseudorandom sequence can be generated based on a nonbinary primitive polynomial over a finite field of any desired length. In a specific disclosed embodiment, the primitive, degree three trinomial $$f(x) = x^3 + x + \alpha^3$$

over the finite field $$F_{128} = F_2[\alpha]/(\alpha^7 + \alpha^3 + 1)$$

is implemented.

15 Claims, 2 Drawing Sheets

RANDOMIZER FOR BYTE-WISE SCRAMBLING OF DATA

BACKGROUND OF THE INVENTION

The present invention relates to digital communication, and more particularly to a data randomizer for use with a QAM modem or the like.

In order to transmit information across a communication path such as a cable television path or telephone line, the information is typically modulated on a carrier. At a receiver, the information must be demodulated from the carrier. Modems are devices which modulate and demodulate information transmitted on and received from a communication path. Modems have evolved from early schemes using frequency shift keying (FSK) at 300 bits per second (BPS) to those using quadrature amplitude modulation (QAM) at rates of 28,800 BPS or higher over a telephone line.

It is conventional to scramble a data stream before it is input to a modem using a binary linear feedback shift register (LFSR) in order to assist in the recovery of the carrier and clock at a receiver. Bit-wise LFSR structures are well known in the art. See, for example, B. Sklar, Digital Communications, Prentice Hall, Englewood Cliffs, N.J., 1988, pp. 547–548 and 694–695. Scrambling, or randomization of the data stream input to a modem is intended to prevent long sequences of logical "1"s or "0"s. The scrambler performs a logical operation on the data bits to be transmitted using a polynomial with binary coefficients implemented via the LFSR. Descrambling is carried out using a circuit that performs the inverse operation using the same polynomial.

The scrambler produces a pseudorandom noise (PN) sequence which is exclusive-OR'd with the transmitted signal to ensure a random transmitted sequence. Such a scrambling approach is particularly applicable when synchronization information is available to the descrambler.

In implementing a binary scrambler using an LFSR, it is advantageous to use a "primitive polynomial," which is one that will result in a maximum length PN sequence for a given length of polynomial. If the LFSR implements a primitive polynomial, then the PN sequence output from the LFSR will comprise a maximum length sequence of length $2^m-1$, where m is the number of LFSR stages (i.e., the "length" of the LFSR and the degree of the binary polynomial). In designing such a scrambler, polynomials with only a few nonzero coefficients are of particular interest in order to reduce hardware complexity. For example, a polynomial with three nonzero terms (i.e., a "trinomial") can provide a particularly advantageous and cost effective scrambler implementation.

The present invention provides a scrambler/descrambler having the aforementioned and other advantages. More particularly, the present invention provides a data randomizer/derandomizer for scrambling/unscrambling data bytes on a "byte-wise" level, wherein data is input to the randomizer or derandomizer a byte at a time, and the bits within the byte are scrambled concurrently.

SUMMARY OF THE INVENTION

The present invention provides a data randomizer for processing bytes of data to scramble data bits contained therein. It should be appreciated that the randomizer can also be used to derandomize (i.e., descramble) data that has already been randomized by a counterpart randomizer. Thus, the term randomizer as used herein and in the claims is intended to also encompass a derandomizer.

Each byte of data processed by the randomizer has an integer number N of bits. The randomizer comprises a linear feedback shift register (LFSR) having a plurality of register stages in series. Each stage is capable of storing an N-bit byte. The LFSR includes at least one feedback tap for implementing a primitive polynomial of degree M over a finite field of size $q=2^N$. Means are provided for multiplying an N-bit pseudorandom output from the LFSR by an N-bit value $f_k$ that is an element of the finite field. The multiplying means are coupled to input the product of the multiplication into a stage of the LFSR.

In an illustrated embodiment, each of the data randomizer register stages comprises N binary registers in parallel. Each of the N registers of a register stage has a counterpart register in the other register stages.

In a specific implementation, N=7 and a primitive polynomial of degree M=3, over the finite field with 128 elements is the polynomial $$f(x)=x^3+x+\alpha^3$$

where $\alpha^3$ is a value in the field and $\alpha$ is a primitive element of the field. The "minimal polynomial" for $\alpha$ (a binary primitive polynomial) is the binary polynomial $x^7+x^3+1$.

In an illustrated embodiment, a data randomizer is provided for scrambling seven-bit data bytes. The randomizer comprises a bank of seven linear feedback shift registers $SR_0$–$SR_6$ for providing as output seven pseudorandom (PN) sequences $Y_0$–$Y_6$, respectively. Each of the LFSRs comprise three register stages in series and have feedback taps after the first and third stages to represent the trinomial $f(x)=x^3+x+\alpha^3$. The PN sequences $Y_0$–$Y_6$ from the third stages of the LFSRs are fed back to the tap that follows the first stage of the respective LFSR. The first stage of LFSRs $SR_6$, $SR_0$, $SR_1$ and $SR_2$ receive as inputs the PN sequences $Y_3$, $Y_4$, $Y_5$ and $Y_6$ respectively. The first stage of LFSRs $SR_3$, $SR_4$ and $SR_5$ receive as inputs the exclusive-ORs $Y_0 \ominus Y_4$, $Y_1 \ominus Y_5$, and $Y_2 \ominus Y_6$, respectively.

The data randomizer can further comprise an exclusive-OR gate following each LFSR for exclusive-ORing the PN sequence from that LFSR with a respective bit of a seven-bit data byte to be scrambled.

Each of the LFSRs is initialized using a nonzero initialization state.

DETAILED DESCRIPTION OF THE INVENTION

Figure 1:
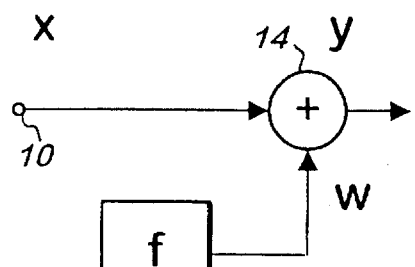
FIG. 1 is a generalized block diagram of a synchronized scrambler.

FIG. 1 illustrates in block diagram form the general concept of a synchronized scrambler for randomizing data X input via terminal 10. The conventional case of such a scrambler involves a binary sequence. A scrambling function 12 which can comprise, for example, a polynomial implemented in a linear feedback shift register, is exclusive-OR'd with the input data X in XOR gate(s) 14. The XOR gate(s) 14 provides a binary addition. The function f provides a pseudorandom noise sequence W which, when exclusive-OR'd with the input data X, provides randomized data y at the output of XOR gate(s) 14.

Figure 2:
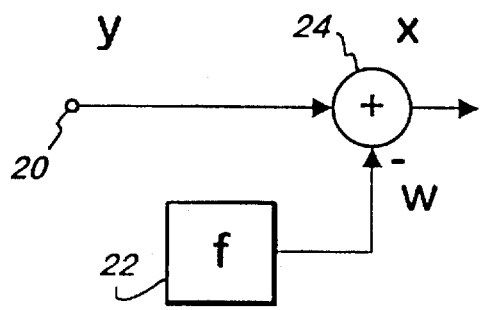
FIG. 2 is a generalized block diagram of a synchronized unscrambler (also referred to as "descrambler")

FIG. 2 is a block diagram of a generalized descrambler that performs the inverse operation of the scrambler illustrated in FIG. 1. The randomized data y is input to XOR gate(s) 24 via terminal 20. Function 22, which is the same as function 12 illustrated in FIG. 1, provides the pseudorandom output W which, when exclusive-OR'd with the scrambled data y, produces the original data X assuming there are no errors in the received data y. As indicated, the XOR gate(s) 24 provides a binary subtraction.

Figure 3:
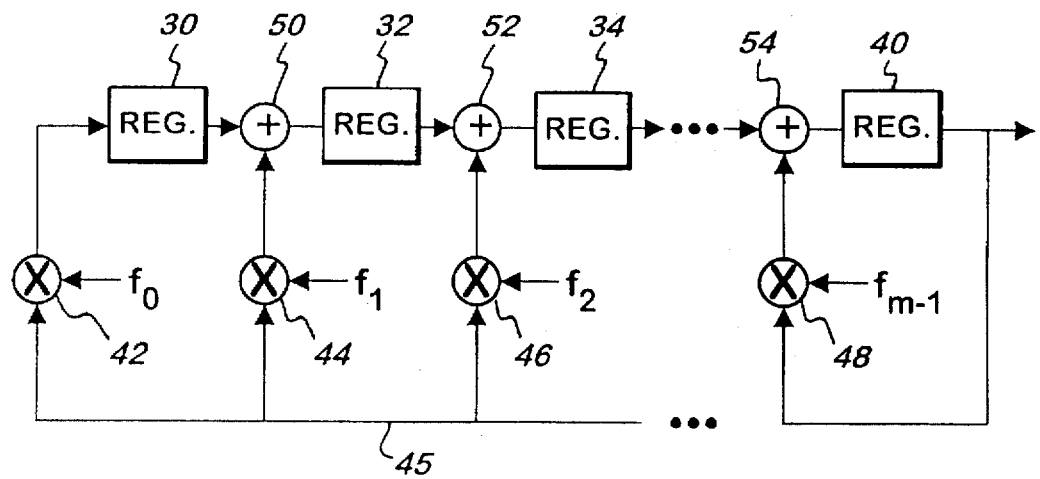
FIG. 3 is a block diagram of a linear shift register PN generator.

FIG. 3 illustrates a linear shift register PN generator. The conventional case of such a PN generator involves a binary sequence. An autonomous LFSR is a clock synchronous shift register augmented with appropriate feedback taps and receiving no external input. It performs as a serial linear finite state machine, where the memory cells are simple D flip-flops and the next state operations are implemented solely by exclusive-OR gates. In the LFSR illustrated in FIG. 3, each register stage 30, 32, 34 . . . 40 can be implemented using a D flip-flop. Coefficients $f_0, f_1, f_2, \ldots f_{m-1}$ of the specific polynomial to be implemented are input via corresponding multipliers 42, 44, 46 . . . 48. Taps, such as taps 50, 52 and 54 are provided for all nonzero coefficients in order to implement the polynomial. In the event taps are provided for any zero value coefficients, they will not be utilized since the respective coefficient input will be zero.

A binary LFSR of length m can be described by a polynomial with binary coefficients of degree m, where the nonzero coefficients of the polynomial denote the positions of the respective feedback taps. The state of the LFSR is denoted by the binary state of its cells. If the LFSR is initialized in a nonzero state, it cycles through a sequence of states and eventually comes back to the initial state, following the functionality of the next state rules implemented by its polynomial description. An LFSR that goes through all possible $2^m-1$ nonzero states is said to be described by a "primitive" polynomial.

The present invention provides both a generalized byte-wise randomizer and a specific data randomizer. The specific implementation disclosed scrambles seven-bit data bytes used in a communication system (e.g., a digital cable television system) having Reed-Solomon (R/S) forward error correction and interleaving that is synchronized using a sync pattern. In particular, the communication system in which the data randomizer of the present invention is used inserts the sync pattern after every 60 R/S codewords. Each codeword is 128 symbols long, with seven bits per symbol. This amounts to a total of 7,680 symbols which is equivalent to 53,760 bits.

The most common method of PN generation is to generate a sequence using a binary, linear feedback shift register specified by a binary polynomial $$f(x)=f_0+f_1x+\ldots+f_mx^m,$$

where $$f_i \in \{0,1\}(f_m=1).$$

If the polynomial is a primitive polynomial, then the generator produces a maximum length sequence of length $2^m-1$. Polynomials with only a few nonzero coefficients are of particular interest, since they can be implemented using less hardware than polynomials with many nonzero coefficients. A polynomial with three nonzero terms, referred to as a trinomial, can be implemented in a linear feedback shift register (LFSR) having only three shift register stages per bit.

Primitive polynomials are well known from Galois field theory. The construction of a Galois field is well known from the literature, and is described in detail, for example, in Lin and Costello, Jr., *Error Control Coding*, Prentice-Hall, 1983, pp. 29–40.

The theory of PN sequences and primitive polynomials extends to other finite fields $F_q$. For example, the finite field with 128 elements (corresponding, e.g., to a 128 symbol R/S codeword) is generated by the irreducible polynomial $$f(x)=x^7+x^3+1.$$

This trinomial is a primitive polynomial and will generate a binary pseudorandom sequence of length 127, which is the maximum possible period $(2^m-1)$. If $\alpha \in F_{128}$ is a root, $f(\alpha)=0$, then $\beta$ is called a primitive element of the field and $\alpha^7=\alpha^3+1$.

A pseudorandom sequence over a finite field $F_q$ can be generated by a polynomial with coefficients over the field. Again, if the polynomial is primitive, the length of the sequence is maximum $(q^m-1)$. For example, for a third degree polynomial over $F_{128}$, a primitive polynomial will generate a sequence of seven-bit symbols of length $$(2^7)^3-1=(2^{21}-1)=2,097,151.$$

Figure 4:
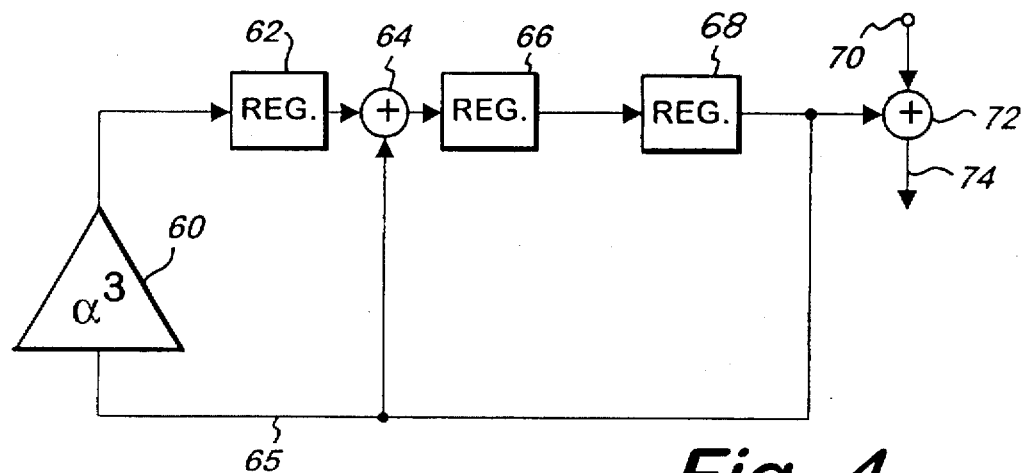
FIG. 4 is a symbol-level block diagram of a byte scrambler in accordance with the present invention.
Figure 5:
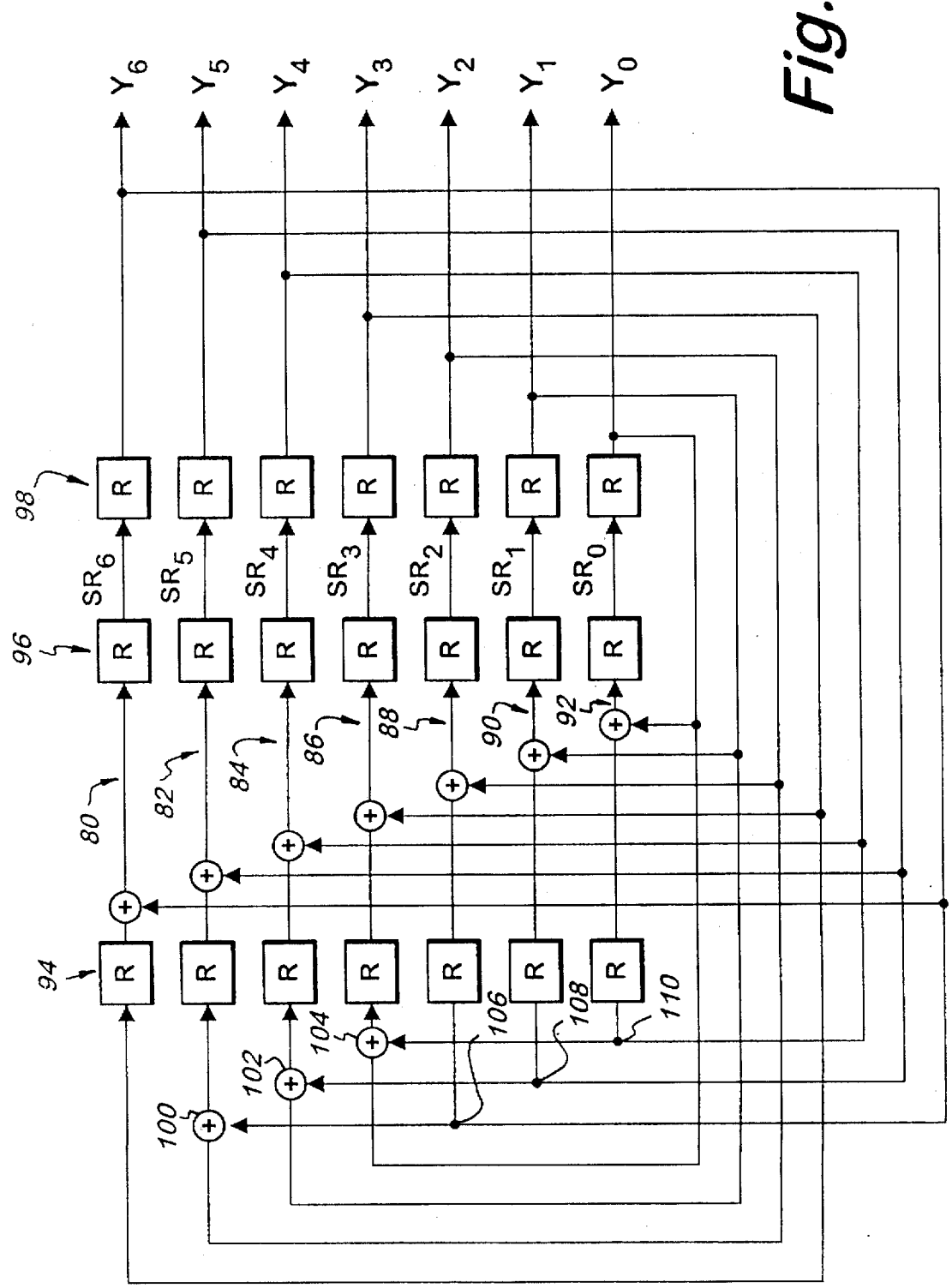
FIG. 5 is a bit-level block diagram of a seven-bit byte scrambler in accordance with the present invention.

The present invention extends the conventional binary implementation of an LFSR randomizer to a nonbinary implementation, wherein a primitive polynomial over a finite field $F_q$, $q>2$, is used. An example implementation of such a randomizer is illustrated in FIGS. 4 and 5. In the specific embodiment illustrated, a primitive, degree 3 trinomial over the finite field $$F_{128}=F_2[\alpha]/(\alpha^7+\alpha^3+1)$$

is implemented. The polynomial $$f(x)=x^3+x+\alpha^3$$

has only one nonzero coefficient that is not one. This is the $\alpha^3$ term, which is a non-zero constant that is an element of $F_{128}$.

In FIG. 4, the constant $\alpha^3$ designated by box 60 multiplies the bits fed back on path 65 prior to shifting the feedback bits into first register 62. Register 62 stores a seven-bit value in the case where a finite field with 128 elements $(F_{128})$ is implemented. Thus, seven-bit bytes can be processed on a byte-wise level, instead of on a bit-wise level as in prior art randomizers. Since the randomizer of FIG. 4 implements a trinomial having nonzero values only for the $x^3$, x and constant terms, taps are provided only after register 62 (the x term) and register 68 (the $x^3$) term. The tap after register 62 is implemented by XOR gate(s) 64. The output of register 68 is fed back via the constant term $\alpha^3$ to register 62. There is no tap after register 66, which corresponds to the $x^2$ term that has a zero coefficient in the polynomial $$f(x)=x^3+x+\alpha^3.$$

As indicated above, it should be appreciated that each of registers 62, 66 and 68 store seven bits at a time, to implement a byte-wise randomizer for processing data in seven-bit data bytes. This differs from prior art devices implementing binary fields and using single-bit registers.

The output of register 68 is a pseudorandom sequence of maximum length $q^m-1$ which, in the case where $m=3$ and $q=128$, corresponds to a maximum length sequence of 2,097,151. This pseudorandom sequence is exclusive-OR'd with data input via terminal 70 to be scrambled. The output of the XOR gate(s) 72 on line 74 comprises the scrambled data.

FIG. 5 is a bit level circuit description of the symbol level block diagram of FIG. 4. Register stages 94, 96 and 98 each include seven separate registers "R" residing in parallel paths 80, 82, 84, 86, 88, 90 and 92. Thus, each register stage 94, 96, 98 is capable of storing a seven-bit byte. As in the symbol level implementation of FIG. 4, taps are provided after the x register stage 94 and the $x^3$ register stage 98. The constant term $\alpha^3$ is implemented using exclusive-OR gates 100, 102 and 104 as well as the connections 106, 108 and 110 illustrated into the respective registers of register stage 94. For the bank of seven linear feedback shift registers 80–92 ($SR_6$–$SR_0$) illustrated in FIG. 5, seven binary pseudorandom sequences $Y_6$–$Y_0$ are generated. Each of these binary PN sequences is fed back to the tap that follows the register 94 of the respective LFSR. The first stage of LFSRs $SR_6$, $SR_0$, $SR_1$ and $SR_2$ receive as inputs the PN sequences $Y_3$, $Y_4$, $Y_5$ and $Y_6$, respectively. The first stage of LFSRs $SR_3$, $SR_4$ and $SR_5$ receive as inputs the exclusive-OR's $Y_0 \ominus Y_4$, $Y_1 \ominus Y_5$, and $Y_2 \ominus Y_6$, respectively. Prior to using the randomizer of FIG. 5, each of the registers in register stages 94, 96 and 98 will be initialized with a definite, nonzero, initial state. For example, each register can be initialized with a binary "1".

Although the implementations of FIGS. 4 and 5 are directed specifically to the trinomial $$f(x)=x^3+x+\alpha^3$$

which is particularly useful for the finite field of $$F_{128}=F_2[\alpha]/(\alpha^7+\alpha^3+1),$$

it should be appreciated that the inventive concept can be used to implement a randomizer for any nonbinary polynomial over a finite field of any possible length. The particular implementation illustrated is particularly suitable for randomizing 128 symbol long Reed-Solomon codewords, where each symbol comprises seven bits.

Although the invention has been described in connection with a specific illustrative embodiment, those skilled in the art will appreciate that numerous adaptations and modifications may be made thereto without departing from the spirit and scope of the invention, as set forth in the claims.

I claim:

1. A data randomizer for processing bytes of data to provide byte-wise scrambling of data bits therein, each byte having an integer number N of bits, said randomizer comprising:

a linear feedback shift register (LFSR) having a plurality of register stages in series, each stage capable of storing an N-bit byte, said LFSR including at least one feedback tap for implementing a primitive polynomial of degree M over a finite field of size $2^N$; and means for multiplying an N-bit pseudorandom output from said LFSR by an N-bit value $f_k$ that is an element of said finite field, said multiplying means being coupled to input a product produced thereby into at least one stage of said LFSR.

2. A data randomizer in accordance with claim 1 wherein each of said register stages comprises N registers in parallel.

3. A data randomizer in accordance with claim 2 wherein each of the N registers of a register stage has a counterpart register in the other register stages.

4. A data randomizer in accordance with claim 3 wherein N=7, M=3 and said primitive polynomial of degree M=3 is the polynomial $f(x)=x^3+x+\alpha^3$, where $\alpha^3$ is said N-bit value of said finite field satisfying $$\alpha^7+\alpha^3+1=0.$$

5. A data randomizer in accordance with claim 1 wherein N=7, M=3 and said primitive polynomial of degree M=3 is the polynomial $f(x)=x^3+x+\alpha 3$, where $\alpha^3$ is said N-bit value of said finite field satisfying $\alpha^7+\alpha^3+1=0$.

6. A data randomizer for scrambling seven-bit data bytes, said randomizer comprising:

a bank of seven linear feedback shift registers $SR_0$–$SR_6$ for providing as output seven binary pseudorandom (PN) sequences $Y_0$–$Y_6$, respectively;

each of said linear feedback shift registers ("LFSRs") comprising three register stages in series and having feedback taps after said first and third register stages;

the PN sequences $Y_0$–$Y_6$ from the third stages of the LFSRs being fed back to the tap that follows the first stage of the respective LFSR;

the first stage of LFSRs $SR_6$, $SR_0$, $SR_1$, and $SR_2$ receiving as inputs the PN sequences $Y_3$, $Y_4$, $Y_5$, and $Y_6$ respectively; and the first stage of LFSRs $SR_3$, $SR_4$, and $SR_5$ receiving as inputs the exclusive-OR's $Y_0 \ominus Y_4$, $Y_1 \ominus Y_5$, and $Y_2 \ominus Y_6$, respectively.

7. The data randomizer of claim 6 further comprising:

an exclusive-OR gate following each LFSR for exclusive-OR'ing the PN sequence from that LFSR with a respective bit of a seven-bit data byte to be scrambled.

8. The data randomizer of claim 7 wherein each of said LFSRs is initialized using a nonzero initialization state.

9. The data randomizer of claim 8 wherein said initialization sequence comprises the state 1.

10. The data randomizer of claim 6 wherein each of said LFSRs is initialized using a nonzero initialization state.

11. The data randomizer of claim 10 wherein said initialization sequence comprises the state 1.

12. A method for byte-wise randomizing of N-bit bytes of data comprising the steps of:

generating N pseudorandom sequences in parallel each over a finite field $F_q$ specified by a nonbinary primitive polynomial with coefficients over the field, where $q=2^N$; and exclusive-ORing a next successive bit from each of said N pseudorandom sequences with a corresponding bit of a next successive N-bit byte to randomize said byte.

13. A method in accordance with claim 12 wherein N=7 and said nonbinary primitive polynomial comprises the trinomial $f(x)=x^3+x+\alpha^3$ over the finite field $F_{128}=F_2[\alpha]/(\alpha^7+\alpha^3+1)$.

14. A method in accordance with claim 13 comprising the further step of initializing said pseudorandom sequence with a non-zero initial state.

15. A method in accordance with claim 12 comprising the further step of initializing said pseudorandom sequence with a nonzero initial state.

* * * * *